United States Patent [19]

Chong

[11] Patent Number: 5,175,684

[45] Date of Patent: Dec. 29, 1992

[54] AUTOMATIC TEXT TRANSLATION AND ROUTING SYSTEM

[75] Inventor: Leighton K. Chong, New York, N.Y.

[73] Assignee: Trans-Link International Corp., Honolulu, Hi.

[21] Appl. No.: 636,400

[22] Filed: Dec. 31, 1990

[51] Int. Cl.$^5$ ............................................. G06F 15/38
[52] U.S. Cl. ...................... 364/419; 379/90
[58] Field of Search ................ 364/419; 379/90, 100; 358/400

[56] References Cited

U.S. PATENT DOCUMENTS

| | | | |
|---|---|---|---|
| 4,352,012 | 9/1982 | Verderber et al. | 235/487 |
| 4,383,307 | 5/1983 | Gibson | 364/900 |
| 4,882,681 | 11/1989 | Brotz | 364/419 |
| 4,980,829 | 12/1990 | Okajima et al. | 364/419 |
| 5,077,804 | 12/1991 | Richard | 382/7 |

FOREIGN PATENT DOCUMENTS 0029881  2/1988  Japan .

OTHER PUBLICATIONS

Patent Abstracts of Japan, vol. 14, No. 489, Aug. 10, 1990, Abstract No. 02-202143, Hashimoto.
Patent Abstracts of Japan, vol. 11, No. 319, May 18, 1987, Abstract No. 62-107376, Ikegami.
Patent Abstracts of Japan, vol. 11, No. 284, Apr. 16, 1987, Abstract No. 62-82853, Hatakeyama.
Patent Abstracts of Japan, vol. 12, No. 62, Sep. 7, 1987, Abstract No. 62-203273, Miike et al.
Patent Abstracts of Japan, vol. 12, No. 100, Oct. 12, 1987, Abstract No. 62-232081.
Patent Abstracts of Japan, vol. 12, No. 187, Dec. 18, 1987, Abstract No. 62-291250, Kenbo et al.

Machine Translation, ed. Sergi Nirenberg, Ch. 2, 1987.
Analyzing Language In Restricted Domains, ed. Ralph Grishman, Preface, 1986.
ECS Natural Language Software (brochure), from Executive Communication Systems, Inc., Provo, Utah, Dec. 1990.

Primary Examiner—Roy N. Envall, Jr.
Assistant Examiner—David Huntley
Attorney, Agent, or Firm—Ostrager & Chong

[57] ABSTRACT

A machine translation system includes an automatic routing system for automatically translating input text of a source language and sending output text of a selected target language to an addressee, in response to designations of the addressee, the target language, and/or the selected sublanguage scanned from a cover page for the input text. The system can interface with a number of input sources, such as a fax machine combined with a page scanner, a fax/modem board, or a network interface coupled to a server computer system. The server computer system can control the operation of the machine translation module for multiple target languages and/or sublanguages as designated by the cover page. A page formatting module is used to compose the translated text into a desired page format, and to provide footnotes for alternate translations of ambiguous phrases of the input text. The cover page can also designate a plurality of addressees in different target languages. The output end of the system may be a fax/modem board for sending output text to an addressee's fax number, a network interface, or a page printer for printed copy. The machine translation module(s) of the system may be upgraded or replaced without disruption to the overall telecommunications routing functions of the system.

23 Claims, 3 Drawing Sheets

FIG. 3 the accompanying drawings, forming a part hereof, in which:

Fig. 1 is a front view of the design of the stove for cooking in accordance with the invention:
Fig. 2 is a top view of the stove of Fig. 1;
Fig. 3 is a bottom view of the stove of Fig. 1;
Fig. 4 is a right side view of the stove of Fig. 1;
Fig. 5 is a left side view of the stove of Fig. 1;
Fig. 6 is a rear view of the stove of Fig. 1.

* 本件材木
**furnance; burner

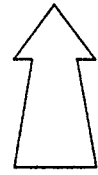

已获利权利的文件清单
1请求书
2权利要求书
3说明书
4说明书附图
5说明书摘要
6摘要附图

AUTOMATIC TEXT TRANSLATION AND ROUTING SYSTEM

TECHNICAL FIELD

This invention generally relates to a system for automatic translation of text, and more particularly, to a system which automatically routes source text from a sender for machine translation to text in a target language to an addressee.

BACKGROUND ART

After several decades of development, the field of automatic (machine) translation of text from a source language to a target language with a minimum of human intervention has developed to a rudimentary level where machine translation systems with limited vocabularies or limited language environments can produce a basic level of acceptably translated text. Some current systems can produce translations for unconstrained input in a selected language pair, i.e., from a chosen source language to a chosen target language, that is perhaps 50% acceptable to a native writer in the target language (using an arbitrary scale measure). When the translation system is constrained to a particular vocabulary or syntax style of a limited area of application (referred to as a "sublanguage"), the results that can now be achieved may approach a 90% acceptable level to a native speaker. The wide difference in results is attributable to the difficulty of producing acceptable translations when the system must encompass a vast body of translation equivalents due to wide variability in vocabulary use, syntax, and expression, as compared to the limited vocabularies and translation equivalents of a chosen sublanguage.

One example of a machine translation system limited to a specific sublanguage application is the TAUM-METEO system developed by the University of Montreal for translating weather reports issued by the Canadian Environment Department from English into French. TAUM-METEO uses the transfer method of translation, which consists basically of the three steps of (1) analyzing the sequence and morphological forms of input words of the source language and determining their phrase and sentence structure, (2) transferring (directly translating) the input text into sentences of equivalent words of the target language using dictionary look-up and a developed set of transfer rules for word and/or phrase selections, then (3) synthesizing an acceptable output text in the target language using developed rules for target language syntax and grammar. TAUM-METEO was designed to operate for the English-French language pair in the narrow sublanguage of meteorology (1,500 dictionary entries, including several hundred place names; input texts containing no tensed verbs). It therefore can obtain high levels of translation accuracy of 80% to 90% by avoiding the need for any significant level of morphological analysis of input words, by analyzing input texts for domain-specific word markers which narrow the range of choices for output word selection and syntax structure, and by using ad hoc transfer rules for output word and phrase selections.

Another example of a sublanguage translation system is the METAL system developed by the Linguistics Research Center at the University of Texas at Austin for large-volume translations from German into English of texts in the field of telecommunications. The METAL system also uses the transfer method, but adds a fourth step called "integration" between the analysis and transfer steps. The integration step attempts to reduce the variability of output word selection and syntax by performing tests on the constituent words of the input text strings and constraining their application based upon developed grammar and phrase rules. Transfer dictionaries typically consist of the order of 10,000 word pairs. In terms of translation quality, the METAL system is reported to have achieved between 45% and 85% correct translations.

A competing strategy to the transfer approach is the "interlingua" approach which attempts to decompile input texts of a source language into an intermediate language which represents their "meaning" or symbolic content, and then convert the symbolically-represented structures into equivalent output sentences of a target language by using a knowledge base of contextual, lexical, syntactical, and grammatical rules. Historically, systems based on the transfer approach have the central problem of obtaining accurate word and phrase selections in the face of ambiguities presented by homonyms, polysemic phrases, and anaphoric references. The interlingua approach is favored because its representation of text meaning can, in theory, greatly reduce ambiguity in the analysis of input texts. Also, once the input text has been decompiled into a symbolically-represented structure, it can theoretically be translated into multiple target languages using the linguistic and semantic rules developed for each target language. In practice, however, the interlingua approach has proven difficult to implement because it requires the development of a universal symbolic language for representing "meaning" and comprehensive knowledge bases for making the conversions from source to intermediate then to target languages. Examples of interlingua systems include the Distributed Translation Language (DLT) undertaken in Utrecht, Netherlands, and the Knowledge-Based Machine Translation (KBMT) system of the Center for Machine Translation at Carnegie-Mellon University.

Other machine translation systems have been developed or are under development using modifications or hybrids of the transfer and interlingua approaches. For example, some systems use human pre-editing and/or post-editing to reduce text ambiguity and improve the correctness of word and phrase selections. Other systems attempt to combine a core transfer approach with knowledge bases and artificial intelligence techniques for machine editing and enhancement. Still another approach is to employ decompilation to a syntactically-based intermediate structure in combination with transfer to equivalent output phrases and sentences. For a more complete discussion of current developments in the field of machine translation, reference is made to *Machine Translation, Theoretical and Methodological Issues*, edited by Sergei Nirenberg, published by Cambridge University Press, 1987, and Proceedings of "The Third International Conference on Theoretical and Methodological Issues in Machine Translation of Natural Language", published by the Linguistics Research Center, University of Texas at Austin, June 1990.

It is expected that machine translation (MT) systems will develop in time to provide higher levels of translation accuracy and utility. However, current MT techniques using a basic transfer approach can produce acceptable translation accuracy in a selected sublanguage, yet they are not in widespread use. One reason for the lack of fruitful use of MT systems is that most current systems are designed as standalone systems which are fed source language input and provide target language output to a single user whose application bridges the source-target language pair. When a specific sublanguage or use environment is selected by the standalone user, the MT system becomes confined to the chosen sublanguage or use. This standalone approach greatly limits the range of applications and the audience of users which can be productively served by MT systems.

SUMMARY OF INVENTION

It is therefore a principal object of the invention to provide a system which can perform machine translation among a plurality of source languages, target languages, and sublanguages via telecommunications links to different users conversant in different languages and in different locations. It is a specific object of the invention that such a system be capable of providing acceptable levels of translation accuracy and be readily upgradable to higher levels of accuracy and utility. It is a particular object that such a system be transparent to users and be capable of operation with a minimum of human intervention.

In accordance with the invention, a machine translation system comprises: a machine translation module which is capable of performing machine translation from input text of a source language to output text of a target language; a receiving interface for receiving via a first telecommunications link an electronic input which is divided into pages, said input pages including a cover page having predefined fields containing system information therein and at least one text page in the source language, wherein said cover page includes at least a first predefined field designating an address of an addressee to which translated output text is to be sent, and wherein said receiving interface includes a recognition module capable of electronically recognizing the address of the addressee designated in said first predefined field of the cover page of the received input pages; a sending interface for sending output text generated by said machine translation module to an addressee via a second telecommunications link; and control means coupled to said receiving interface, said machine translation module, and said sending interface for recognizing the address designated in said first predefined field of said cover page, for controlling said machine translation module to generate output text of the target language from the input text of the source language, and for operating said sending interface to automatically send the translated output text via the second telecommunications link to the address recognized from said first predefined field of said cover page.

In the preferred embodiment, the receiving interface may include a fax machine combined with a page scanner device or a fax/modem board coupled to a server computer system. The server computer system includes a programmed module for recognizing input text scanned in from the scanner device or input through the fax/modem board. The recognition module recognizes and stores the information contained in the predefined fields of the cover page, and converts the scanned-in electronic data into text input of the source language. The server computer system or a separate language processing computer system operates a programmed machine translation module for translating the input text into output text of the target language. A programmed output module is used for composing the translated output text into a desired page format appropriate to a particular addressee or target language. The page formatting program may have a footnoting function for providing footnotes of ambiguous phrases of the input text in their original source language and/or with alternate translations in the target language.

The machine translation module may encompass a plurality of target languages and/or a plurality of sublanguages in one or more target languages. The desired source language and/or target language and/or sublanguage are designated by the sender in other predefined fields of the cover page, and the computer server system selects the corresponding language pair and/or sublanguage translation module in response to the cover page designations. The cover page may also designate a plurality of addressees in a plurality of address locations and target languages. The sending interface may include a fax/modem board, a printer coupled with a page facsimile transmission machine and/or an automatic mailing machine, or may be a network interface for sending an electronic representation of the output text to the addressee's electronic address, via the second telecommunications link. As machine translation improvements are developed, the machine translation program module(s) of the system may be upgraded or replaced without disruption to the overall telecommunications routing functions of the system.

Other objects, features, and advantages of the present invention will become apparent from the following detailed description of the best mode of practicing the invention when considered with reference to the drawings, as follows:

BRIEF DESCRIPTION OF DRAWINGS

FIG. 3 is an illustration of an example of automatic translation from an input ideographic text to an output English text using page formatting functions.

DETAILED DESCRIPTION OF PREFERRED EMBODIMENTS

Figure 1:
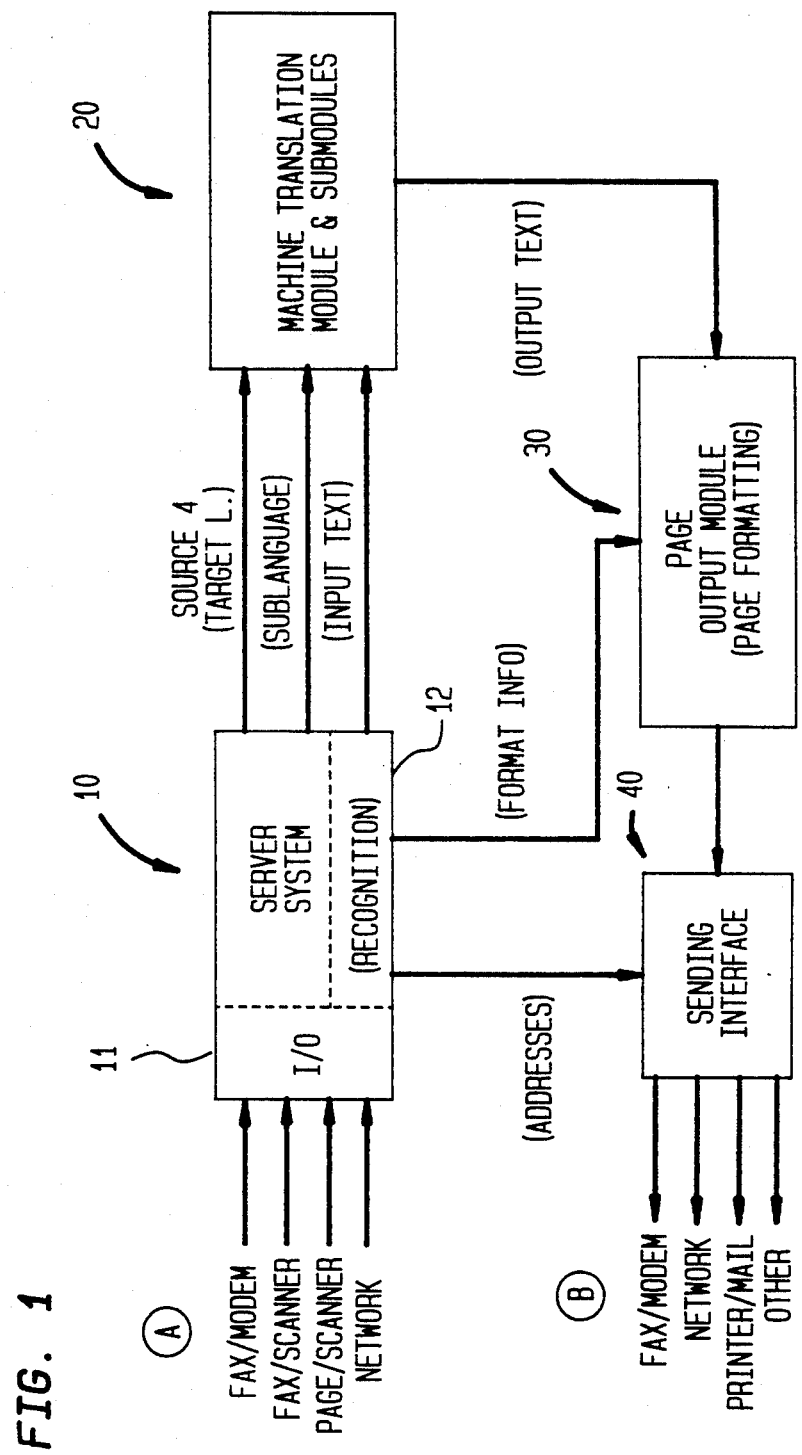
FIG. 1 is a schematic diagram of a machine translation and routing system in accordance with the invention.

Referring to FIG. 1, a machine translation and routing system in accordance with the invention includes a computer server system 10 serving as a receiving interface, including an I/O front end 11, for receiving electronic input representing input pages from a first telecommunications link A, which may be linked to a plurality of input sources, a machine translation module 20 which is capable of performing machine translation from input text of a source language to output text of a selected target language, a page output module 30 for formatting the translated output text into a selected page format, and a sending interface unit 40 for sending the formatted output text to one or more selected addressees via a second telecommunications link B, which may be linked to a plurality of output devices.

By scanning predefined fields of a cover page of the input data, the server system 10 can automatically recognize the sender's selection of the source language of the input text, the target language(s) of the output text, a particular sublanguage (specialized field of terminology or correspondence type), any preferred page format for the output text, and the address(es) of one or more addressees to whom the translated text pages are to be sent. The machine translation module 20 can contain a plurality of submodules for different source/target language pairs and sublanguages. With this system, input data in a source language received on telecommunications link A are automatically translated and routed to one or more addressees in the respective target language(s) via telecommunications link B without the need for any human intervention. Furthermore, the machine translation program module or submodules of the system may be upgraded or replaced without disruption to the telecommunications routing functions of the system.

The server system 10 can be interfaced with a plurality of receiving devices. For example, input data can be received as an electronic fax transmission via a fax/modem board which is plugged into I/O bus connectors for the server system. Such fax/modem boards are widely available and their operation in a computer server system is well understood to those skilled in this field. Input may also be received from a conventional facsimile machine coupled to a telephone line which prints facsimile pages converted from signals transmitted on the telephone line. A conventional page scanner with a sheet feeder can be used to scan in the facsimile pages as graphics data automatically into a designated memory of the computer server system. Alternatively, input may be received from printed pages received through ordinary mail which are likewise scanned into the computer server system. The server system includes a recognition module 12 which electronically scans and converts the input data to system data and text data. Input may also be received through a network interface as an electronic text file (such as ASCII text). If electronic text is transmitted, conversion to text data by the server system is not required.

The input data faxed, scanned, or transmitted to the computer server system 10 are converted into system data and input text data using a character recognition program. For scanned or faxed input, optical character recognition (OCR) programs are widely available and their operation is well known in this field. For example, an OCR program for scanning and recognizing Japanese kana and ideographic characters is offered by Catena Corp., Tokyo, Japan. An example of an OCR program capable of handling graphics and alphanumeric text is WordScan TM offered by Calera Recognition Systems, Santa Clara, California. The OCR program is used to recognize text pages of the input data as input text, and is also programmed or customized to recognize system information designated in certain fields of a cover page of the input data. The OCR program is preferably resident as an application program in the server computer system 10 along with the interface programs for handling the reception of input and sending of output data automatically under program control. The computer server system 10 is preferably a high-speed multi-tasking PC computer or workstation, for example, a system having an Intel 80386 TM or 80486 TM microprocessor with at least 6MB of internal memory and using a Xenix TM or Unix TM operating system.

Figure 2:
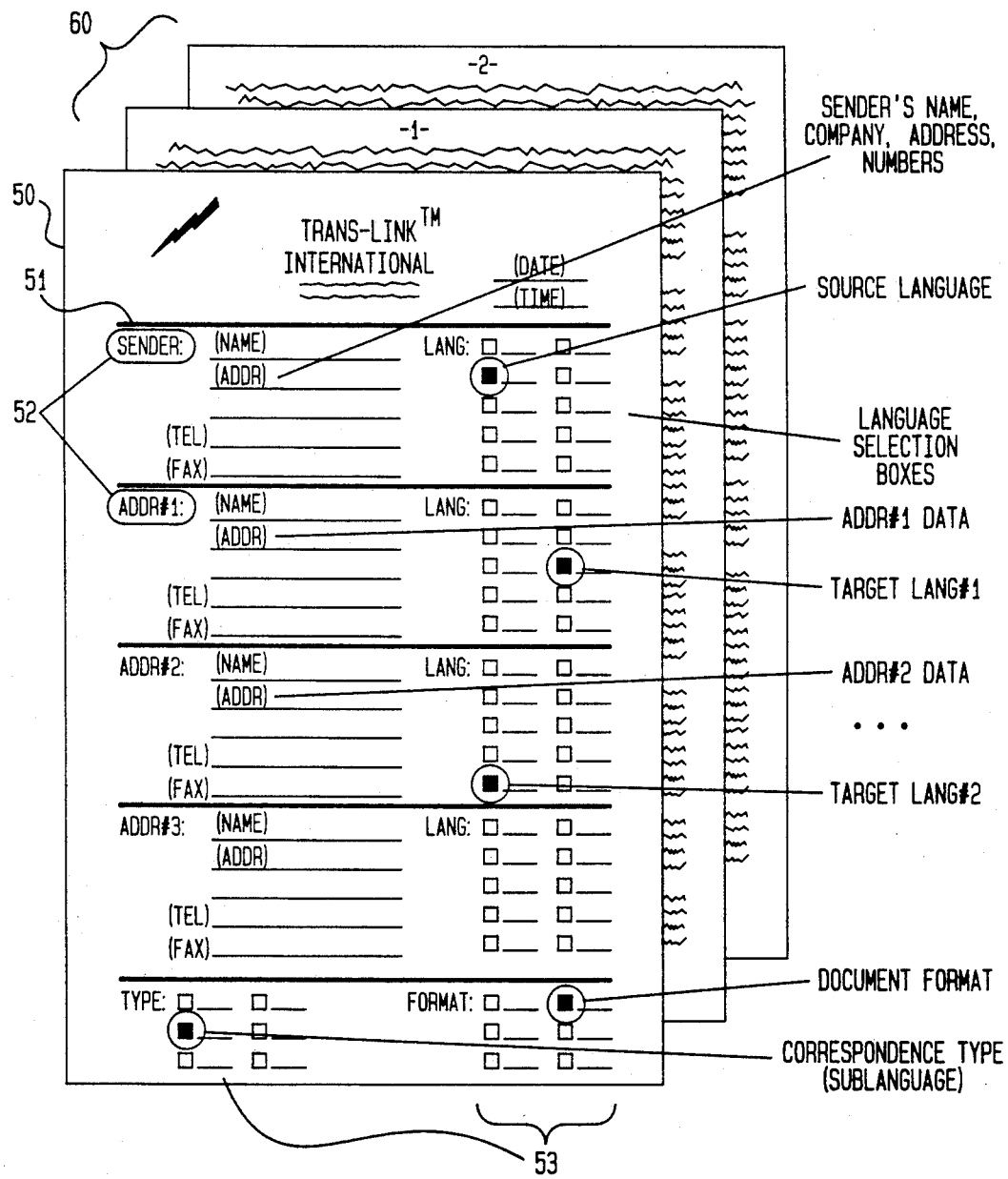
FIG. 2 is an illustration of a cover page for designating source/target language, sublanguage, and addressee information, and accompanying input text pages.

Referring to FIG. 2, the server system 10 receives input data which is divided into a number of pages. One input page is a cover page 50 having a number of fields containing language selection, page format selection, and addressee routing information used by the system. In the invention, the cover page has a predefined format which is recognized by the recognition module 12 of the computer server system 10 so that the system information in the predefined fields can be readily determined. For example, the cover page may be laid out and formatted with field boundaries and markings which can be optically scanned with a high level of reliability. This is particularly important when the system is used to process text scanned from a printed page or a facsimile page. Line dividers 51 and large type-size headers 52 may be used to identify and separate the sender, selection, and addressee(s) fields. Boxes 53, which can be marked or blackened in, allow the selected source and target languages, correspondence type (sublanguage), and output page format to be determined without error. The names of the sender and addressee(s), their respective companies, their addresses, and their telephone and/or facsimile transmission numbers are determined by character recognition once the respective fields 51, 52 have been distinguished. One or more text pages 60 follow the cover page 50, and the text therein is converted to text data by the recognition module 12 of the computer server system 10, as previously described. Alternatively, the selection, command, and addressee information of the cover page and the text pages for an electronic text transmission may be defined by a predetermined coding or indexing.

The machine translation module and submodules 20 may be incorporated in the server computer system 10 or in a separate translation processing system. A minicomputer, parallel processor, or supercomputer may be used for translation processing at high speeds or for handling multiple language pairs, sublanguages, and/or addressees in different languages. Currently, machine translation programs are available commercially that will operate on a personal computer or lower speed workstation, for example, the ECS Natural Language Processing System offered by Executive Communication Systems, Inc., Provo, Utah. The machine translation module 20 is configured as a separate module which receives command data designating the source and target language pair and sublanguage, if any, and the text data from the computer server system 10. In this manner, the machine translation program(s) is(are) kept separate from the recognition, page formatting, and routing functions of the computer server 10 so that they can be easily upgraded and/or replaced with enhanced programs without disruption to the remainder of the system. The computer server system acts as a control unit for the machine translation module by selecting the submodule for the language pair and/or sublanguage to be used according to the cover page designations.

Machine translation is generally performed by passing each sentence of the text to be translated through a series of stages. Typically, these stages include:
Source text dictionary lookup and morphological analysis
Identification of homographs
Identification of compound nouns
Identification of nouns and verb phrases
Processing of idioms
Processing of prepositions
Subject-predicate identification
Syntactic ambiguity identification
Synthesis and morphological processing of target text
Rearrangement of words and phrases in target text In the transfer approach to machine translation, the source language sentence is first parsed into an annotated structure representation, then a transfer is made at the lexical and structural levels into word equivalents and corresponding lexical structures in the target language, then the target language sentence is synthesized using a store of grammar and lexical rules. A dictionary of word equivalents and set of morphological, grammar, and lexical rules are required for each source-target language pair. For a multilingual system of m source languages and n target languages, m x n language pair submodules are required. If each language pair uses an open language model with a wide range of vocabulary and syntactic modes of expression, the size and complexity of the language pair submodules and the capacity required of the system for all submodules become unmanageably large. In the interlingua approach, the input source language sentence is parsed into a universal intermediate language representation and then generated into the target language sentence. Theoretically, only m parser and n generator modules would be required. However, as previously discussed, an acceptable, universal intermediate language representation has yet to be developed for the interlingua approach. Reference is made to *Machine Translation, Theoretical and Methodological Issues*, edited by Sergei Nirenberg, published by Cambridge University Press, 1987, and Proceedings of "The Third International Conference on Theoretical and Methodological Issues in Machine Translation of Natural Language", published by the Linguistics Research Center, University of Texas at Austin, June 1990, for a more detailed explanation of these two basic approaches.

The present invention prefers a hybrid strategy of using the transfer approach, which has been commercially implemented with an acceptable level of accuracy, combined with limiting the chosen language pair to a selected one of a number of sublanguages. Each sublanguage is chosen to have a manageable dictionary size, predictable modes of expression and syntactic structures, and a well-understood context for disambiguation of homonyms, polysemic phrases, and anaphoric references. A language pair is designated for the sender-addressee, and a correspondence type may also be designated for narrowing the transfer task in a selected sublanguage, as shown in FIG. 2. Examples of correspondence types, i.e. sublanguages, include:

Business letters
Legal/technical analysis
Technical writing
Financial/market reports
General writing Business correspondence typically employs only a few pages, a limited vocabulary (i.e., on the order of 6000 words), and a limited set of syntactic structures (i.e. declarative sentences). References commonly used in business correspondence (i.e., title of the addressee, name of the department or division, and subject matter reference) can be used to resolve contextual ambiguity. Thus, a sublanguage module of small size and low complexity can readily be implemented for selection of the business correspondence type in each language pair offered for selection.

Legal/technical analysis and technical writing typically employ a larger but more technical vocabulary than business correspondence, and perhaps more limited syntactic structures. For technical writing, a well-developed dictionary directed to a particular technical field, e.g., medical, chemical, electronic, legal, etc., can greatly facilitate the transfer into equivalent words or structures of the target language. Similarly, financial reports have their own well-defined vocabulary and limited syntactic structures.

The cover page designation of a correspondence type, i.e., sublanguage, within a given language pair allows the server system to command the loading of the corresponding sublanguage submodule in the translation processing module 20. The use of a sublanguage submodule increases the likelihood that a high level of accuracy will be achieved in the resulting translation, since a well-directed vocabulary and disambiguation context or rules are employed. Designation of "General Writing" as a submodule allows a more generalized vocabulary to be used or can control searching of the dictionaries and lexical tables of the other, more specialized submodule of the language pair.

Sublanguage submodules are also relatively easy to implement using currently available MT programs of the transfer approach. For example, the ECS Natural Language Processing System offered by Executive Communication Systems, Inc., Provo, Utah, provides a set of universal tools to develop a machine translation product in any chosen language pair and sublanguage. A Rule Editor tool allows a linguist to create and modify morphological rules, phrase structure rules, and transfer rules for the submodule. A Word Editor allows creation and modification of lexical entries, including source entries, target entries, and source-to-target entries in a dictionary. A Translation Module performs table-driven translation using linguistic tables (syntax rules, transfer rules, and control entries) that have been compiled into the dictionary. A Morphology Rule Generation Module generates the rules to determine lexical items and find the uninflected forms for dictionary lookup. A Dictionary Maintenance Module allows updating of lexical entries in the dictionary. A Semantic Preference Module allows creation of semantic preference nets for lexical disambiguation and preferred phrase translations. Translation may be performed in either direction of a language pair, or a separate module may be set up for translation in a reverse direction.

The translation modules and submodules may be continually updated by human intervention based upon analyses of translation results in trials or actual operation. The machine translation module(s) of the system may be upgraded or replaced without disruption to the overall telecommunications routing functions of the system. Because of the modularity of the translation system of the present invention, an interlingua system may be substituted for transfer modules when such a system has been developed to a sufficient level of reliability.

Referring to FIGS. 1 and 3, once the input text has been translated into target language text, the page output module 30 composes the translated text into a desired page format based upon the formatting information designated on the cover page. For example, for English-to-Japanese translation, the output Japanese text may be formatted as "left-to-right" horizontal lines of kana, or as "right-to-left" vertical lines of ideographic characters. The page format may also be designated for "page-by-page" translation, wherein the formatting program takes into account the compression ratio between the source and target text. For example, English text is typically more spatially expansive than ideographic text, so that an 8.5"×11" input page of English text may be reformatted on the same size page with Chinese characters of suitably larger point size and interline spacings. Correspondingly, a typical 15.2 cm×25.6 cm page of ideographic text may be reformatted as an 8.5"×11" page of English text, or an 8.5"×11" or A4-size page may be reformatted as an 8.5"×14" page.

The formatting program may also implement a footnoting function, as shown in the section "F" in FIG. 3, providing footnotes for ambiguous phrases of the input text by replicating their original source language text (indicated by single asterisk) and/or providing alternate translations in the target language (indicated by double asterisks). The source language phrase and/or alternate translation is provided by the translation module 20 by flagging an ambiguous word or phrase which could not be resolved in the translation processing. Other well-known page formatting functions, e.g., margins, page layout, columns, replication of non-translatable graphic images, etc., may also be performed by the page output module 30.

When the formatted output document is ready for output transmission, the sending interface 40 becomes operative to generate the command signals for controlling the corresponding output devices and sending the output document as electronic data signals to the respective devices through the telecommunications link B. The output devices can include a telephone fax/modem board, a printer coupled with a page facsimile transmission machine and/or an automatic mailing machine (for mailing hard copy), or a network interface for sending the output data to the addressee's electronic address on a network. As shown in FIG. 1, the cover page may designate a plurality of addressees in a plurality of target languages and located at a plurality of addresses. The sending interface 40 generates and routes the appropriate forms of output data to each addressee. For example, if each addressee is designated to receive a fax transmission and a printed copy, the sending interface routes the data through the fax/modem board to each addressee's fax number and also activates the printer and collation of pages for automatic mailing.

Numerous modifications and variations are possible given the above disclosure of the principles of the invention. It is intended that all such modifications and variations be considered as within the spirit and scope of the invention, as defined in the following claims.

I claim:

1. A machine translation system comprising:
   a machine translation module which is capable of performing machine translation from input text of a source language to output text of a target language, said machine translation module having a plurality of target language submodules for performing machine translation into a plurality of different target languages;
   a receiving interface for receiving via a first telecommunications link an electronic input which is divided into pages, said input pages including a cover page having predefined fields containing system information therein and at least one text page in a source language, wherein said cover page includes at least a first predefined field designating an address of an addressee to which translated output text is to be sent, and a second predefined field designating a selected one of the plurality of different target languages into which the at least one text page is to be translated, and
   wherein said receiving interface includes a recognition module capable of electronically recognizing the address of the addressee designated in said first predefined field of the cover page of the received input pages, and the selected target language designated in said second predefined field of the cover page;
   a sending interface for sending output text generated by said machine translation module to an addressee via a second telecommunications link; and
   control means coupled to said receiving interface, said machine translation module, and said sending interface for recognizing the address and target language designated in said predefined fields of said cover page, for controlling said machine translation module to generate output text of the designated target language from the input text of the source language, and for operating said sending interface to automatically send the translated output text via the second telecommunications link to the designated address recognized from said predefined fields of said cover page.

2. A machine translation system according to claim 1, wherein said receiving interface is coupled to receive input data through an optical page scanner device.

3. A machine translation system according to claim 1, wherein said receiving interface is coupled to receive input data through a facsimile modem device.

4. A machine translation system according to claim 1, wherein said receiving interface is coupled to receive input data through a network interface.

5. A machine translation system according to claim 1, wherein said recognition module of said receiving interface is programmed for performing character recognition conversion of said at least one text page into text data.

6. A machine translation system according to claim 1, wherein said recognition module of said receiving interface is programmed for converting input data of said cover page into system data for controlling said system.

7. A machine translation system according to claim 1, wherein said machine translation module includes a plurality of source and target language pair submodules for performing machine translation from a plurality of different source languages into a plurality of different target languages, and said control means is operated to determine a selected source language and a selected target language designated in the predefined fields of said cover page and to control said machine translation module to load a corresponding language pair submodule for performing translation in the designated language pair.

8. A machine translation system according to claim 1, wherein said control means is operated to determine a selected sublanguage of the input text designated in the predefined fields of said cover page and to control said machine translation module to load a corresponding sublanguage submodule for performing translation in the respective sublanguage.

9. A machine translation system according to claim 1, wherein said control means is operated to determine a plurality of addresses of a plurality of addressees designated in the predefined fields of said cover page and to control said sending interface to send the translated output text to the respective addressees.

10. A machine translation system according to claim 1, wherein said sending interface is coupled to send output data through a page printer device.

11. A machine translation system according to claim 1, wherein said sending interface is coupled to send output data through a facsimile modem device.

12. A machine translation system according to claim 1, wherein said sending interface is coupled to send output data through a network interface.

13. A machine translation system according to claim 1, further comprising an output page formatting module for formatting the translated output text from said machine translation module into a selected page format designated in the predefined fields of said cover page.

14. A machine translation system according to claim 13, wherein said output page formatting module includes a page formatting function for formatting the output text into pages corresponding respectively to the input text pages.

15. A machine translation system according to claim 13, wherein said output page formatting module includes a page formatting function for footnoting ambiguous phrases of the input text in their original source language or with alternate translations in the target language.

16. A machine translation system according to claim 1, wherein said machine translation module is programmed to perform translation by a transfer method.

17. A machine translation system according to claim 1, wherein said machine translation module is programmed to perform translation by an interlingua method.

18. A machine translation system according to claim 1, wherein said machine translation module is separately programmed from said receiving interface, said sending interface, and said control means, such that it may be upgraded or replaced without disruption to the overall telecommunications routing functions of the system.

19. A machine translation system according to claim 1, wherein said machine translation module is a separately programmed translation processing computer, and said receiving interface, said sending interface, and said control means are programmed on a server computer system coupled to said translation processing computer.

20. A machine translation system comprising:
a machine translation module which is capable of performing machine translation from input text of a source language to output text of a target language, wherein said module includes a main source dictionary having common words of the source language defined therein and a plurality of subdictionaries each having specialized words of a respective one of a plurality of predefined sublanguage domains included within the source language defined therein, and said module has means for loading any selected one of said subdictionaries with said main dictionary for performing translation of an input text in the source language;
a receiving interface for receiving an electronic input representing a text input to said machine translation system and a sublanguage control input indicative of a selected one of a plurality of sublanguages within the source language applicable to the text input;
an output interface for output of translated text in the target language generated by said machine translation module; and
control means coupled to said receiving interface and said machine translation module and responsive to the sublanguage control input indicative of the selected sublanguage applicable to the text input for causing said machine translation module to load the corresponding selected subdictionary with said main dictionary of the source language for performing translation of the input text,
wherein said sublanguage control input to said system includes input representing a cover page having a predefined field designating a selected sublanguage domain which is applicable to the input text to be translated, and said control means includes means for operating said machine translation module to automatically load the subdictionary corresponding to the sublanguage domain designated in the predefined field of said cover page.

21. A machine translation system according to claim 20, wherein said electronic input to said system includes input representing a cover page having a predefined field designating an address of an addressee to which the translated text is to be sent, said output interface includes a sending interface for sending an electronic output of the translated text via a telecommunications link to a designated addressee, and said control means includes means for operating said sending interface to automatically send the translated output text via the telecommunications link to the address of the addressee designated in the predefined field of said cover page.

22. A machine translation system according to claim 21, wherein a plurality of target languages and a plurality of addressees are designated in predefined fields of said cover page, and said control means includes means for operating said machine translation module to translate the input text in the designated plurality of target languages and for operating said sending interface to send the translated text outputs to the respective addressees designated in the predefined fields of said cover page.

23. A method of performing machine translation in a transfer-type machine translation system comprising the steps of:
providing a machine translation module capable of performing machine translation from input text of a source language to output text of a target language;
dividing a dictionary operable with the machine translation module into a main source dictionary having common words of the source language defined therein and a plurality of subdictionaries each having specialized words of a respective one of a plurality of predefined sublanguage domains included within the source language defined therein;
receiving an electronic input representing a text input to the machine translation module and a predefined sublanguage control input representing a selected on of the plurality of sublanguages within the source language applicable to the text input, wherein said sublanguage control input to said system includes input representing a cover page having a predefined field designating a selected sublanguage domain which is applicable to the input text to be translated;
operating said machine translation module to automatically load the subdictionary corresponding to the sublanguage domain designated in the predefined field of said cover page.

* * * * *